Nov. 28, 1944.    W. W. ROACH ET AL    2,363,623
CATALYST CHAMBER
Filed April 24, 1943
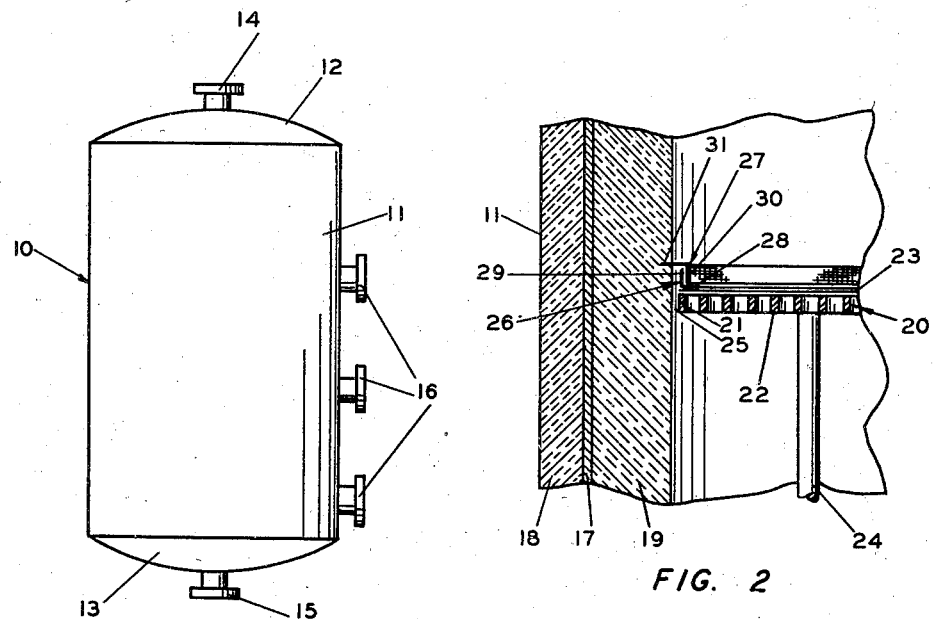
FIG. 1
FIG. 2
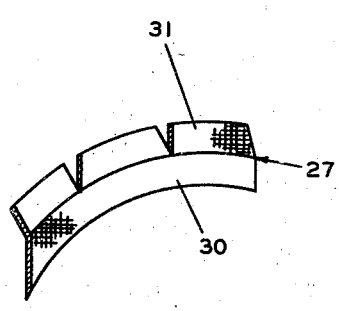
FIG. 3
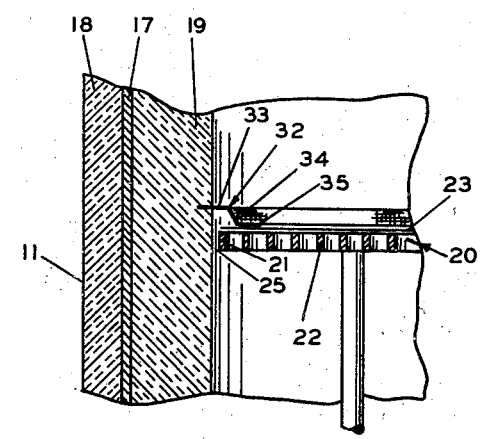
FIG. 4
INVENTORS.
W. W. ROACH
R. E. VINYARD
BY
ATTORNEYS.

Patented Nov. 28, 1944

2,363,623

UNITED STATES PATENT OFFICE 2,363,623

CATALYST CHAMBER

Wendell W. Roach, Kansas City, Mo., and Roy E. Vinyard, Borger, Tex., assignors to Phillips Petroleum Company, a corporation of Delaware Application April 24, 1943, Serial No. 484,414

8 Claims. (Cl. 23—288)

This invention relates to catalyst chambers of the class generally employed in carrying out hydrocarbon conversions in the presence of substantially fixed masses of catalytic material. In its more specific aspects, the present invention pertains to improvements in catalyst chambers of the character indicated wherein a single vessel is subdivided into a plurality of compartments arranged one above the other and adapted to contain a mass of catalytic material.

Catalyst vessels are of particular utility in the catalytic conversion of hydrocarbon oils, especially in the cracking of said oils, to facilitate direct heat transfer and temperature control within the catalyst mass. Thus in the catalytic cracking of hydrocarbon oils, it is usually desirable to supply heat to vapors of said oils undergoing treatment during the conversion period and to remove heat developed in the course of the exothermic reactivation of the catalyst by combustion of the carbon deposited thereon.

The preferred and generally recognized method of controlling the temperature within catalyst masses of low thermal conductivity contemplates the direct injection of gases or vapors to thereby either heat or cool the catalyst mass, depending upon whether the ensuing reaction is endothermic or exothermic. In carrying out this procedure it is essential that suitable fluid injection and distribution apparatus be provided in order that the temperature control medium employed may properly admix with other vapors or gases flowing through the catalyst. This is conveniently accomplished by arranging the catalyst in a series of sections with intermediate free spaces for the introduction of gaseous diluents and/or reaction mixtures.

In the construction of catalyst chambers or vessels for such multi-contact masses, there are numerous features requiring specialized design. These include the provision of necessary supporting structures for the gratings or basket type containers on which the catalyst is deposited and which serve to separate each catalyst bed from succeeding beds. These gratings must be so constructed and arranged as to permit uniform passage of gaseous reactants while preventing any displacement of catalyst particles from one bed to an adjacent bed. Experience has demonstrated that the individual gratings are subject to displacement relative to the chamber itself as a result of thermal expansion and contraction of the supporting structures with temperatures changes. It is, therefore, important that requisite clearance be provided to permit of such relative movement between each grating and the chamber.

A preferred type of construction comprises the fabrication of catalyst gratings from suitable metal gratings and catalyst retaining screens and the support and spacing of these gratings on legs which rest on the grating immediately below. The weight of each bed of catalyst and grating is thus supported on the next lower grating with the lowermost grating either supported above the bottom of the chamber or resting directly thereon, as desired. A free space is provided intermediate adjacent gratings and the surface of the catalyst bed on the next lower grating for the introduction and passage of process or diluent gases. Unless effective sealing means is provided between the upper catalyst gratings and the inner surface of the chamber, there is a tendency for particles of catalyst to sift by gravity or be carried by the gas stream through the clearance space between the edge of a grating or basket and the inner chamber wall to the next lower grating. Moreover, process vapors may pass through the clearance spaces instead of through the catalyst bed on a grating with resultant reduction in the contact time required for conversion and with inefficient and non-uniform utilization of the catalyst material.

We have discovered that the above indicated objectionable displacement of catalyst and/or the channeling or by-passing of process vapors can be effectively prevented by the use of the barriers or sealing means of the present invention. As will be evident from the detailed description appearing further along, these sealing means afford an efficient barrier against movement of solids or channeling of gases through the clearance spaces without hampering necessary relative movement between the gratings and the chamber.

It is, therefore, the primary object of this invention to provide a catalyst chamber of improved construction and design.

Another object of the invention is the provision of a structure of the character indicated that is capable of performing its intended functions in an effective and efficient manner.

Our invention has for a further object the provision of means for the effective sealing of clearance spaces provided between the periphery of catalyst gratings and the inner wall of a catalyst chamber while permitting relative movement between said gratings and chamber.

These as well as additional objects and advantages will be readily apparent to persons skilled in the art by reference to the following description and annexed drawing, which respectively describe and illustrate preferred embodiments of the invention, and wherein Figure 1 is an elevation view of a catalyst chamber;

Figure 2 is an enlarged cross sectional view through a portion of the vertical wall of Figure 1;

Figure 3 is an isometric view of part of the sealing means depicted in Figure 2;

Figure 4 is similar to Figure 2 and illustrates a modified form of the invention.

Referring to the drawing and more particularly Figure 1 thereof, we have denoted a catalyst chamber generally indicated by reference numeral 10 and including a vertical cylindrical side wall 11, a top wall 12 and a bottom wall 13. A stream of hydrocarbon feed stock to be processed within chamber 10 is preferably introduced thereinto through an inlet 14 while the conversion products are discharged therefrom by way of a conversion outlet 15. A plurality of spaced inlets 16 is provided in vertical side wall 11 for the admission of suitable diluent into the chamber whereby the temperature developed in the chamber in the course of normal use may be controlled within a desirable predetermined range. As is illustrated in Figures 2 and 4, the walls of the chamber are fabricated from plate or sheet metal 17 of requisite thickness and composition. The outer surface of the metal chamber is provided with a covering of insulation 18 of the asbestos type whereas the inner surface carries a suitable sheath of refractory insulation 19.

A plurality of spaced circular gratings 20, one of which is shown in each of Figures 2 and 4, is positioned within the chamber. These gratings preferably consist of a ring 21 that embraces a grid-work 22 upon which there is disposed a metallic screen 23, coextensive with the top of the gratings and having a mesh of such sizes as to permit the passage of fluid material therethrough but preventing the passage of catalyst material from an upper grating to the next lower grating. Supports 24 that are integral with the individual gratings extend downwardly and rest on the next low grating to maintain the gratings in desired spaced relation.

It will be observed from an examination of the drawing that the width of grating 20 is somewhat less than the internal diameter of chamber 10 to provide a clearance space 25 and allow vertical movement of the grating in the chamber. Solid catalyst of selected size for use in the conversion is placed on each screen. As was indicated above, it is important to form an effective seal across the clearance space otherwise objectionable passage of catalyst material and/or unconverted hydrocarbons will occur therethrough. This invention eliminates such an eventuality by the use of the sealing means or barriers shown in the drawing. The sealing means illustrated in Figures 2 and 3 consists of a lower ring 26 and an upper ring 27. The lower ring includes an inwardly extending portion 28 and an upwardly extending portion 29 while the upper ring includes downwardly extending portion 30 and an outwardly extending portion 31. Lower ring 26 is carried by grating 20 whereas upper ring 27 is secured to the chamber by imbedding outwardly extending portion 31 in insulation 19. The diameter of upwardly extending portion 29 is less than the internal diameter of the chamber but is greater than the diameter of downwardly extending portion 30. By virtue of this relationship upper portion 29 of ring 26 is free to move in the annular space defined by the interior of the chamber and downwardly extending portion 30 of ring 27.

The embodiment of the invention illustrated in Figure 4 discloses a modified form of sealing means 32, said sealing means is in the nature of a flexible resilient ring having an outwardly extending upper portion 33 that is imbedded in insulation 19, a downwardly extending portion 34 and an inwardly extending portion 35. When the gratings are at their lowermost position, portion 35 is adapted to contact the screen 23. Upon upward movement of the gratings due to elongation of the parts with temperature increases, sealing means 32 will be flexed upwardly but will maintain a proper seal at all times.

The sealing rings of our invention are preferably formed of screening material similar to that of the grating screens 23, in order to permit the flow of fluids therethrough. The composition of the rings is such as to render them capable of being distorted and flexed without becoming embrittled or otherwise damaged due to the relatively high temperatures employed in the conversion procedure or during the reactivation of the catalyst material.

Individual sealing rings may be formed of sections that are joined by welding or otherwise within the chamber, or if desired, the various sections may be placed in overlapping or abutting relation without being permanently joined into a unitary structure.

From the foregoing, it is believed that the construction, operation and advantages of our instant invention will be readily comprehended by persons skilled in the art. It is to be clearly understood, however, that various changes in the apparatus may be resorted to without departing from the spirit of the invention, as defined by the appended claims.

I claim:

1. In a catalyst chamber having a substantially vertical side wall and at least one grating within the chamber and supported independently of the side wall thereof, said grating being vertically movable in the chamber and spaced from the inner surface of the side wall to form a substantially annular clearance space therewith, the improvement comprising means for forming a barrier above the clearance space to prevent the flow of solid particles greater than a predetermined size therethrough, said means including a member secured to the chamber above and closely adjacent the grating and projecting into the chamber a distance greater than the width of the clearance space at the top of the grating.

2. In a catalyst chamber having a substantially vertical side wall and at least one grating within the chamber and supported independently of the side wall thereof, said grating being vertically movable in the chamber and spaced from the inner surface of the side wall to form a substantially annular clearance space therewith, the improvement comprising means for forming a barrier above the clearance space to prevent the flow of solid particles greater than a predetermined size therethrough, said means including a perforate member secured to the chamber above and closely adjacent the grating and projecting into the chamber a distance greater than the width of the clearance space at the top of the grating.

3. In a catalyst chamber having a substantially vertical cylindrical side wall, the inner surface of which is provided with a sheath of heat insulating material, the improvement comprising at least one perforate substantially circular grating positioned in the chamber and supported independently of the side wall thereof, said grating being vertically movable in the chamber and being spaced from the sheath of insulating material to form an annular clearance space therewith, and means for forming a barrier above the clearance space to prevent the passage of solid particles therethrough and including a member imbedded in the sheath of insulating material and projecting into the chamber a distance greater than the width of the clearance space at the top of the grating, the projecting portion of said member being above and closely adjacent the grating.

4. In a catalyst chamber having a substantially vertical cylindrical side wall, the inner surface of which is provided with a sheath of heat insulating material, the improvement comprising at least one perforate substantially circular grating positioned in the chamber and supported independently of the side wall thereof, said grating being vertically movable in the chamber and being spaced from the sheath of insulating material to form an annular clearance space therewith, and perforate means for forming a barrier above the clearance space to permit the flow of fluid material but to prevent the passage of solid particles greater than a predetermined size therethrough, said means including a perforate member imbedded in the sheath of insulating material and projecting into the chamber a distance greater than the width of the clearance space at the top of the grating, the projecting portion of said perforate member being above and closely adjacent the grating.

5. In a catalyst chamber having a substantially vertical cylindrical side wall, the inner surface of which is provided with a sheath of heat insulating material, the improvement comprising at least one perforate substantially circular grating positioned in the cylinder and vertically movable therein, said grating being spaced from the sheath of insulating material to form an annular clearance space therewith, and means for forming a barrier above the clearance space to prevent the passage of solid particles therethrough, said means including a member having an upper portion and a lower portion, said upper portion being imbedded in the sheath of insulating material and extending into the chamber a distance greater than the width and clearance space, said lower portion extending downwardly of the upper portion and being spaced from the surface of the sheath of insulating material, and a second member having a base portion carried by the grating and an upwardly extending portion projecting into the space between the surface of the sheath of insulating material and the downwardly extending portion of the first member.

6. In a catalyst chamber having a substantially vertical cylindrical side wall, the inner surface of which is provided with a sheath of heat insulating material, the improvement comprising at least one perforate substantially circular grating positioned in the cylinder and vertically movable therein, said grating being spaced from the sheath of insulating material to form an annular clearance space therewith, and perforate means for forming a barrier above the clearance space to permit the flow of fluid material but to prevent the passage of solid material greater than a predetermined size therethrough, said means including a perforate member having an upper portion and a lower portion, said upper portion being imbedded in the sheath of insulating material and extending into the chamber a distance greater than the width of the clearance space, said lower portion extending downwardly of the upper portion and being spaced from the surface of the sheath of insulating material, and a second perforate member having a base portion carried by the grating and an upwardly extending portion projecting into the space between the surface of the sheath of insulating material and the downwardly extending portion of the first member.

7. In a catalyst chamber having a substantially vertical cylindrical side wall, the inner surface of which is provided with a sheath of heat insulating material, the improvement comprising at least one perforate substantially circular grating positioned in the cylinder and vertically movable therein, said grating being spaced from the sheath of insulating material to form an annular clearance space therewith, and means for forming a barrier above the clearance space to prevent the passage of solid particles therethrough, said means comprising a flexible resilient member imbedded in the sheath of insulating material and extending into the chamber a distance greater than the width of the clearance space at the top of the grating, a portion of said member extending downwardly and bearing against the upper surface of the grating.

8. In a catalyst chamber having a substantially vertical cylindrical side wall, the inner surface of which is provided with a sheath of heat insulating material, the improvement comprising at least one perforate substantially circular grating positioned in the cylinder and vertically movable therein, said grating being spaced from the sheath of insulating material to form an annular clearance space therewith, and perforate means for forming a barrier above the clearance space to permit the flow of fluid but to prevent the passage of solid material greater than a predetermined size therethrough, said means comprising a perforate flexible resilient member imbedded in the sheath of insulating material and extending into the chamber a distance greater than the width of the clearance space at the top of the grating, a portion of said member extending downwardly and bearing against the upper surface of the grating.

WENDELL W. ROACH.
ROY E. VINYARD.